May 1, 1934.  A. F. MASURY  1,957,072

SPRING SUSPENSION FOR SIX-WHEEL VEHICLES

Filed Oct. 14, 1931

INVENTOR
Alfred F. Masury,
BY
Redding, Greeley, O'Shea & Campbell
HIS ATTORNEYS.

Patented May 1, 1934

1,957,072

UNITED STATES PATENT OFFICE 1,957,072

SPRING SUSPENSION FOR SIX-WHEEL VEHICLES

Alfred F. Masury, New York, N. Y., assignor to International Motor Company, New York, N. Y., a corporation of Delaware Application October 14, 1931, Serial No. 568,724

5 Claims. (Cl. 267—36)

The present invention relates to spring suspensions and embodies, more specifically, an improved form of spring suspension for six wheel vehicles, the suspension being adapted to mount the two rear driving wheels at either side of the vehicle upon the frame. Where driving wheels of this character are mounted upon a housing as a unit the entire unit being mounted upon the frame and the movement thereof with respect to the frame cushioned by means of springs, considerable strain is placed upon the springs since the springs must not only take the up and down oscillations but must also steer the unit when the vehicle is turning a curve. Furthermore, when one wheel receives a side kick, the transverse stresses placed upon these springs becomes highly objectionable.

An object of the invention, accordingly, is to provide a spring mounting adapted particularly for the mounting of a plurality of driving wheels upon a vehicle frame at one side thereof the mounting being of such character as to relieve the springs of objectionable stresses.

A further object of the invention is to provide a spring mounting of the above character by means of which steering forces may be effectively transmitted from the frame to the wheel members.

Further objects, not specifically enumerated above, will be apparent as the invention is described in greater detail in connection with the accompanying drawing, wherein.

Figure 1:
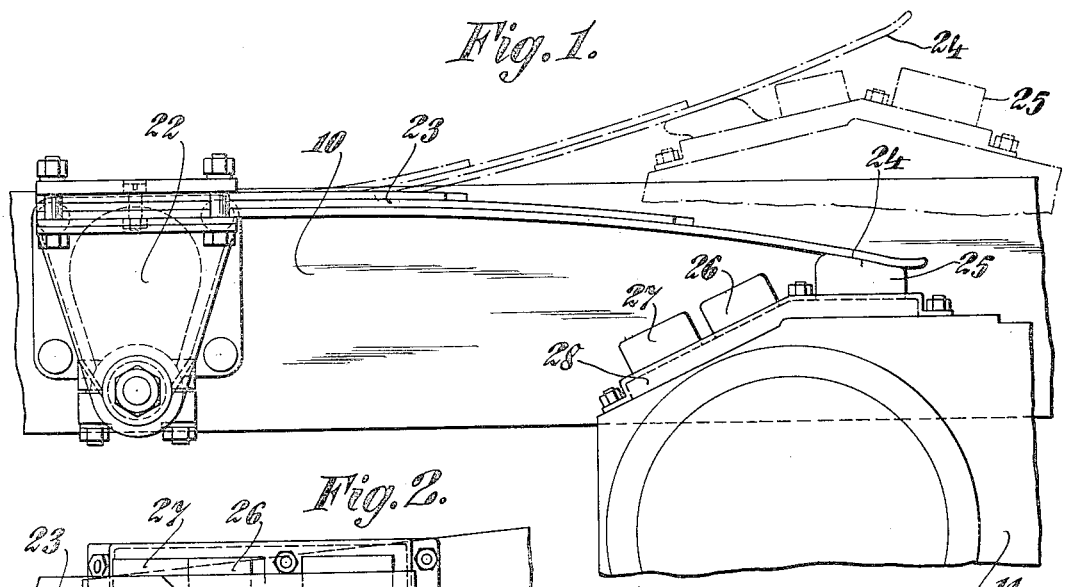
Figure 1 is a segmental view in side elevation showing the spring mounting constructed in accordance with the present invention.
Figure 2:
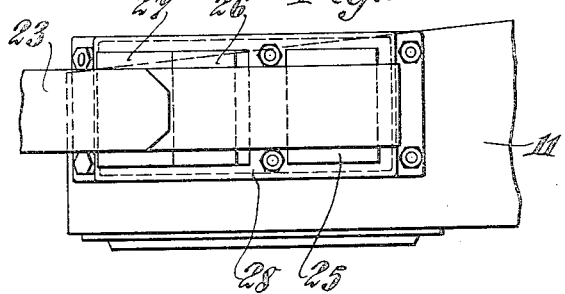
Figure 2 is a segmental plan view of the free spring end and cooperating bearing structure on the wheel unit.

In the construction shown in Figures 1 and 2, the frame member 10 is provided with a bracket 22 to which is anchored the end of a quarter elliptic spring 23. The end of spring 23 is provided with a plane bearing surface 24 which is adapted to engage upon blocks of yielding non-metallic material 25, 26, and 27 secured upon the wheel unit 11 by means of a plate 28. The unit 11 is adapted to carry a wheel at each of its ends and is pivotally mounted intermediate its ends on an axle (not shown) which is spring mounted on the vehicle main frame 10. The bracket 28 is formed with portions lying in different planes, the block 25 lying in a relatively horizontal plane in order that the plate bearing surface 24 may normally engage the same as shown in full lines in Figure 4. When the wheel unit passes over irregular terrain and is turned upon its mounting, the blocks 26 and 27 progressively come into play against the face of the bearing surface 24 as indicated in dot and dash lines in Figure 4. Not only does this construction effectively serve as an auxiliary spring mounting to transmit gravitational stresses between the unit and frame, but the lateral kicks impressed upon the individual wheels, as well as the steering forces, are effectively resisted by reason of the friction between the surface 24 and the blocks 25, 26, and 27.

Figure 3:
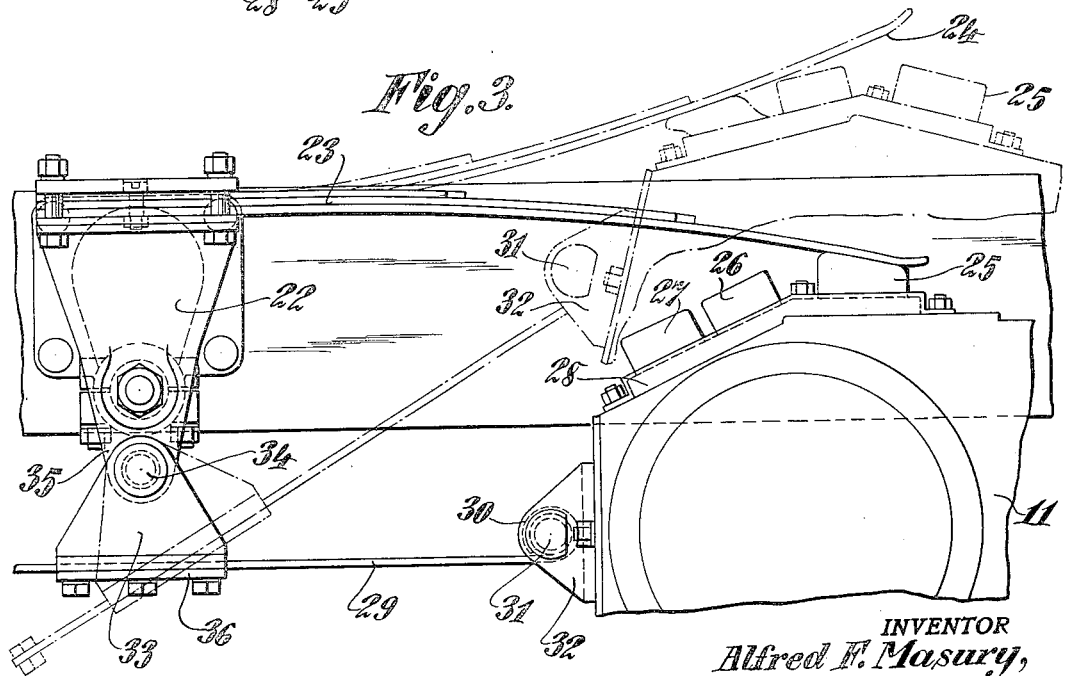
Figure 3 is a view in side elevation, similar to Figure 1, and showing a modified form of spring mounting which facilitates the steering of the wheel unit.

In the construction shown in Figure 3, the steering of the wheel unit is effected by means of a helper spring 29 which is formed with an eye 30 adapted to receive a pin 31 which is carried by a bracket 32 secured upon the wheel unit 11. The spring 29 is slidably mounted in a bracket 33 which is journaled upon a pin 34, carried by an extension 35 of the bracket 22. A cover plate 36 is secured to the bracket 33 to retain the spring 29 therein and limit its movement to sliding movement within the bracket.

From the foregoing, it will be seen that a spring mounting has been provided for wheel units which may journal a plurality of wheels and the mounting is of such character that steering of the unit is effected thus relieving the same from the stresses resulting upon the dragging of the wheels carried by the unit when the vehicle turns a corner.

Furthermore, lateral kicks and stresses received by the individual wheels are effectively cushioned and the main springs thus relieved of these objectionable strains.

While the invention has been described with specific reference to the accompanying drawing, it is not to be limited, save as defined in the appended claims.

I claim as my invention:

1. In combination with a vehicle frame and a wheel unit mounted yieldingly thereon, an auxiliary spring, means to anchor one end of the spring to the frame, a bearing surface on the other end of the spring, and yielding non-metallic blocks on the unit engaged by the bearing surface.

2. In combination with a vehicle frame and a wheel unit mounted yieldingly thereon, an auxiliary spring, means to anchor one end of the spring to the frame, a bearing surface on the other end of the spring, and yielding non-metallic blocks on the unit engaged by the bearing surface and lying in different planes.

3. In combination with a vehicle frame and a wheel unit mounted yieldingly thereon, an auxiliary spring, means to anchor one end of the spring to the frame, a bearing surface on the other end of the spring, and yielding non-metallic blocks on the unit engaged by the bearing surface, certain of the blocks lying in a horizontal plane and other of the blocks lying in a plane sloping away from the horizontal and adapted to be engaged by the bearing surface subsequent to the engagement of the first block thereby.

4. In combination with a vehicle frame and a wheel unit mounted yieldingly thereon, an auxiliary spring mounted between one end of the unit and the frame, a second spring pivoted on one of the members for movement in a vertical plane, and means to mount the other end of the second spring slidably upon the other member.

5. In combination with a vehicle frame and a wheel unit mounted yieldingly thereon, an auxiliary spring mounted between one end of the unit and the frame, a second spring pivoted on the unit at one end thereof, a bracket pivoted on the frame, and means to mount the other end of the last named spring slidably in the bracket.

ALFRED F. MASURY.